(12) United States Patent
Leung

(10) Patent No.: US 6,901,597 B2
(45) Date of Patent: May 31, 2005

(54) MULTIPLE DISC PLAYER

(75) Inventor: Wilson Wai Sing Leung, Hong Kong (HK)

(73) Assignee: Alco Electronics Limited, Quarry Bay (HK)

( * ) Notice: Subject to any disclaimer, the term of this patent is extended or adjusted under 35 U.S.C. 154(b) by 131 days.

(21) Appl. No.: 10/631,738

(22) Filed: Aug. 1, 2003

(65) Prior Publication Data

US 2005/0024995 A1 Feb. 3, 2005

(51) Int. Cl.[7] .......................... G11B 17/03; G11B 17/22
(52) U.S. Cl. .................................. 720/600; 369/30.86
(58) Field of Search ....................... 720/600; 369/30.86, 369/30.89, 30.8, 30.9

(56) References Cited

U.S. PATENT DOCUMENTS

| | | | | |
|---|---|---|---|---|
| 4,754,445 A | * | 6/1988 | Young et al. ............ | 369/30.86 |
| 5,828,633 A | * | 10/1998 | Inatani et al. ............ | 369/30.86 |
| 6,084,833 A | * | 7/2000 | Ohkawara et al. ........ | 369/30.89 |
| 2002/0012294 A1 | * | 1/2002 | Fukushima et al. ...... | 369/30.86 |
| 2003/0058754 A1 | * | 3/2003 | Nagone ................... | 369/30.35 |

* cited by examiner

Primary Examiner—Allen Cao
(74) Attorney, Agent, or Firm—Leydig, Voit & Mayer, Ltd.

(57) ABSTRACT

A multiple disc player comprises a turntable for holding twenty discs upright in an annular arrangement, a playing mechanism for playing a selected disc from the turntable, and a disc slider for moving the selected disc from the turntable to the playing mechanism and later back to the turntable. A motor-driven drive mechanism operates the turntable, the playing mechanism and the disc mover. The turntable includes twenty disc brackets for supporting the discs thereon respectively, each support being slidable radially from and to the turntable. The disc slider is releasably engageable with a disc support supporting the selected disc for moving the disc by the support.

11 Claims, 7 Drawing Sheets

US 6,901,597 B2

MULTIPLE DISC PLAYER

The present invention relates to a multiple disc player that includes a turntable for holding a plurality of discs for playing.

BACKGROUND OF THE INVENTION

Existing multiple disc players usually incorporates a disc changer that typically holds the discs in a stack, either horizontally or vertically, or in an annular arrangement on a turntable. A disc retrieval mechanism is included for moving a selected disc to and from a disc playing mechanism. Known retrieval mechanisms tend to have a complicate construction, for example including a clip or clamp for picking up and transporting a disc through an arcuate path.

The invention seeks to provide an improved multiple disc player.

SUMMARY OF THE INVENTION

According to the invention, there is provided a multiple disc player comprising:

a turntable for holding a plurality of discs generally upright in an annular arrangement;

a playing mechanism provided adjacent the turntable for playing a selected one of the discs retrieved from the turntable;

a disc mover for moving said selected disc from the turntable to the playing mechanism and later back to the turntable; and a motor-driven drive mechanism for operating the turntable, the playing mechanism and the disc mover;

wherein the turntable includes a plurality of disc supports for supporting the discs thereon respectively, each support being slidable substantially radially from and to the turntable; and the disc mover is releasably engageable with a disc support supporting said selected disc for moving the disc by the support.

Preferably, each disc support is elongate and extends radially on the turntable.

More preferably, each disc support includes a co-extending central recess for locating a corresponding disc by its lower rim.

More preferably, the turntable includes a circular base having an upper side that has an annular arrangement of radially-extending channels slidably locating the disc supports respectively.

In a preferred embodiment, the turntable is rotatable about an annular retainer that retains the disc supports to the turntable by their inner ends, the retainer including a break for releasing one of the supports that supports said selected disc.

More preferably, the turntable includes a circular base locating the disc supports, the base having an opening or openings adjacent the retainer that expose the inner ends of the disc supports for retaining by the retainer.

It is preferred that the disc supports have outer ends including respective hooks facing in one direction for engagement by a co-operating hook of the disc mover facing in the opposite direction, such that the support hooks are rotatable relative to the mover hook.

In a preferred embodiment, the disc mover is supported for substantially linear movement by the drive mechanism to move a disc support between the turntable and the playing mechanism, thereby transporting said selected disc on the disc support between the turntable and the playing mechanism.

In a preferred construction, the disc mover includes a platform for supporting the disc support upon reaching the playing mechanism at a predetermined position, such that said selected disc is centrally in substantially alignment with a rotary disc support and clamp of the playing mechanism.

More preferably, the platform is supported for upward and downward movement such that it is sinkable to free said selected disc for spinning by the playing mechanism.

The playing mechanism preferably comprises a playing unit having a rotary disc support and clamp and a laser head and includes a clamping unit, the two units being mounted for pivotal movement above respective axes substantially perpendicular to the turntable.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
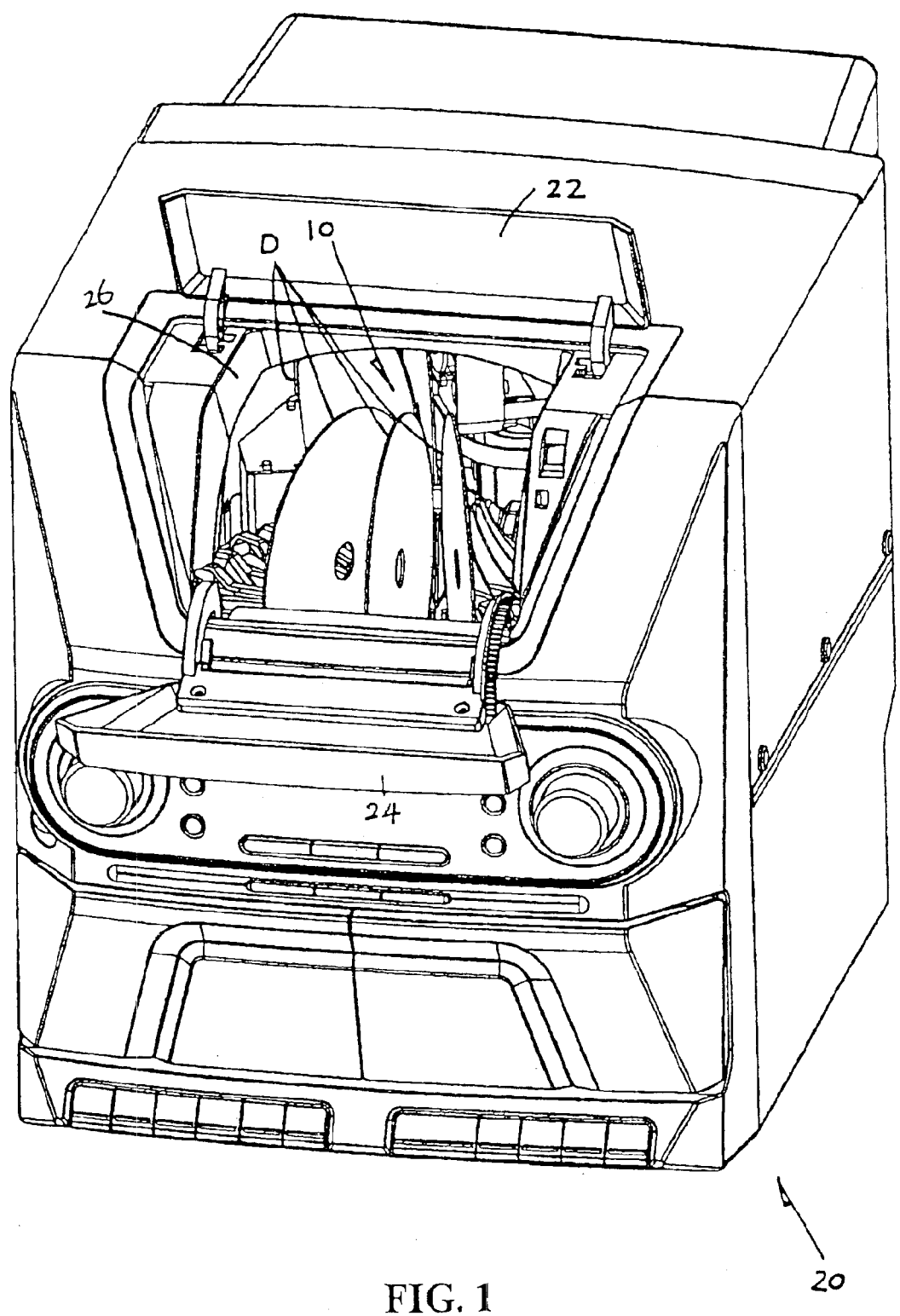
FIG. 1 is a front perspective view of a disc player that incorporates an embodiment of a multiple disc changer in accordance with the invention.

Referring to the drawings, there is shown a multiple disc player 20 embodying the invention including an internal disc changer 10, which player 20 has front and top lids 22 and 24 openable to reveal an opening 26 that permits access to the disc changer 10. The disc changer 10 has a base 100 housing a drive mechanism 200, and includes a horizontal disc turntable 300 and a disc playing mechanism 400 supported thereon. Both turntable 300 and playing mechanism 400 are operated by the drive mechanism 200 in a predetermined sequence.

Figure 2:
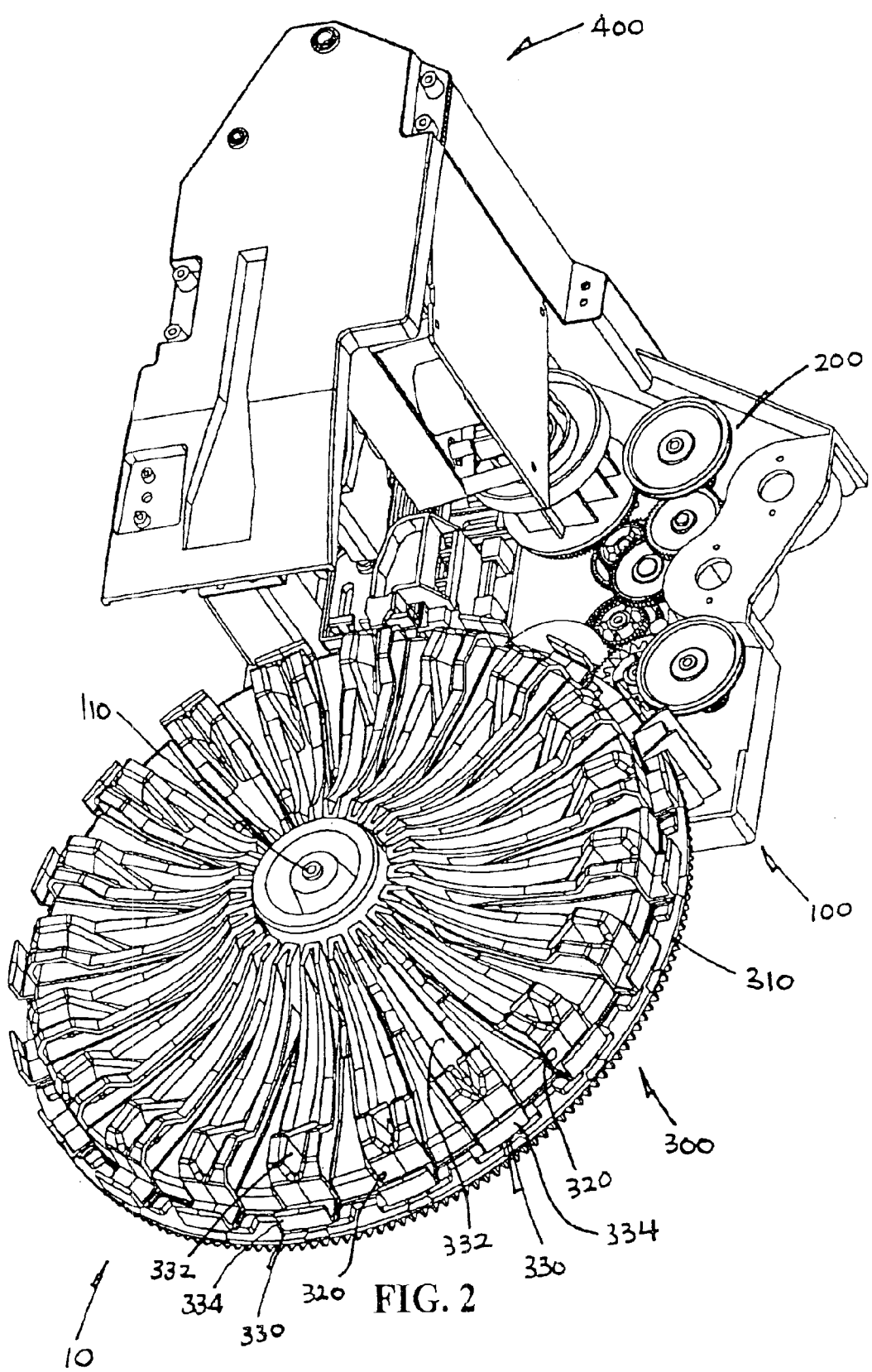
FIG. 2 is a top perspective view of the disc changer of FIG. 1.

The turntable 300 is designed to hold a total number of twenty medium-storage discs, such as compact discs D, generally upright in an annular arrangement symmetrically around the axis of rotation. It is formed by a circular base plate 310 having an upper side angularly castellated to provide an annular arrangement of twenty identical radially-extending segmental channels 320, and includes the same number of identical wedge-like brackets 330 located in the respective channels 320 (FIG. 2). Each channel 320 has a bottom opening (not shown) at its inner end through the base plate 310.

Each bracket 330 is elongate and is slidable radially into and out of the corresponding channel 320, and includes a co-extending central recess 332 for supporting or locating a corresponding disc D vertically by its lower rim. The recess 332 is curved slightly upwards at opposite ends to retain the disc D. The outer and inner ends of the bracket 330 are formed with respective upwardly and downwardly facing hooks 334 and 336.

The turntable 300 is rotatable about an upstanding axle 110 of the base 100 at a front position thereof. The axle 110 is surrounded by a short cylindrical collar 112 that serves to retain the brackets 330 on the turntable 300 by their inner end hooks 336 protruding out through the aforesaid channel bottom opening. The collar 112 includes a rearmost break 114 for releasing the bracket 330 turned to the rearmost position by the turntable 300, such that this rearmost bracket 330 can slide radially away from and back onto the turntable 300.

The playing mechanism 400 is mounted vertically at a rear position on the base 100, which incorporates a playing unit 410 and a clamping unit 420. The playing unit 410 includes a first motor 412 for spinning a disc D by means of a rotary disc support (not shown) and a second motor 414 for moving a laser head (not shown) to read a spinning disc D. The clamping unit 420 includes a rotary disc clamp 422 for holding a spinning disc D.

The two units 410 and 420 are mounted to face each other and are geared for simultaneous pivotal movement about respective vertical axles at the back to open for loading and unloading a disc D and to close for playing the disc D. The gap between the two units 410 and 420 is aligned with the centre of the turntable 300 straight from behind, such that they can accept a selected disc D transported linearly thereto by the aforesaid rearmost bracket 330.

The drive mechanism 200 is implemented by an electric motor 210 (not fully depicted), a speed-reduction gear train 220, a linear slider 230 for sliding the rearmost bracket 330, and a rotary cam 240 for, inter alia, opening and closing the playing mechanism 400. The gear train 220 includes an input pulley/gearwheel 221 driven by the motor 210, a first output gearwheel 222 for turning the turntable 300, a second output gearwheel 223 for sliding the slider 230, and a third output gearwheel 224 for rotating the cam 240.

The slider 230 has a body 231, a horizontal bottom toothed rack 232 extending forwardly from one side of the body 231, and a downwardly facing front hook 233 on the body 231, all being fixed together. A fixture, including two claws 120, of the base 100 supports the slider 230, in part by the toothed rack 232, for sliding movement. The body 231 lies immediately above an oblong sinkable platform 234, which is in turn positioned by a slidable mount 236 on the far side thereof. Both platform 234 and mount 236 are movable to a limited extent as hereinafter described.

The gearwheel 223 is in mesh with the toothed rack 232 for sliding the overall slider 230. The hook 233 serves to releasably engage the rearmost bracket 330 by its outer end hook 334 (FIG. 3) for pulling the bracket 330 from the turntable 300 onto the platform 234. Upon rotation of the gearwheel 223, the slider 230 is slid rearwards to move the bracket 330 to a predetermined position below the playing mechanism 400, thereby slotting a disc D located on the bracket 330 into the playing mechanism 400. The gearwheel 223 will disengage from the rack 232 (FIG. 4) as soon as the disc D reaches a position centrally in alignment with the disc support and clamp 422 of the playing mechanism 400, whereupon the slider 230 stops and the bracket 330 rests solely on the platform 234.

The rotary cam 240 is rotatable about a vertical axis, having upper and lower end discs 241 and 243. The upper end disc 241 is formed with a top spiral cam track 242 in sliding engagement with a depending pin (not shown) of the playing unit 410 for pivoting the unit 410 and in turn also the clamping unit 420. The lower end disc 243 has a concentric bottom gearwheel 244 in mesh with the gearwheel 224 for rotation thereby, and includes a bottom spiral cam track 245. Situated immediately below the gearwheel 244 is a horizontal sliding bar 246 which has a first end 247 in sliding engagement with the bottom cam track 245 and an opposite second end 248 extending across the platform 234 to reach the mount 236. The second end 248 slidably engages with an slanted slot 237 of the mount 236.

Figure 5:
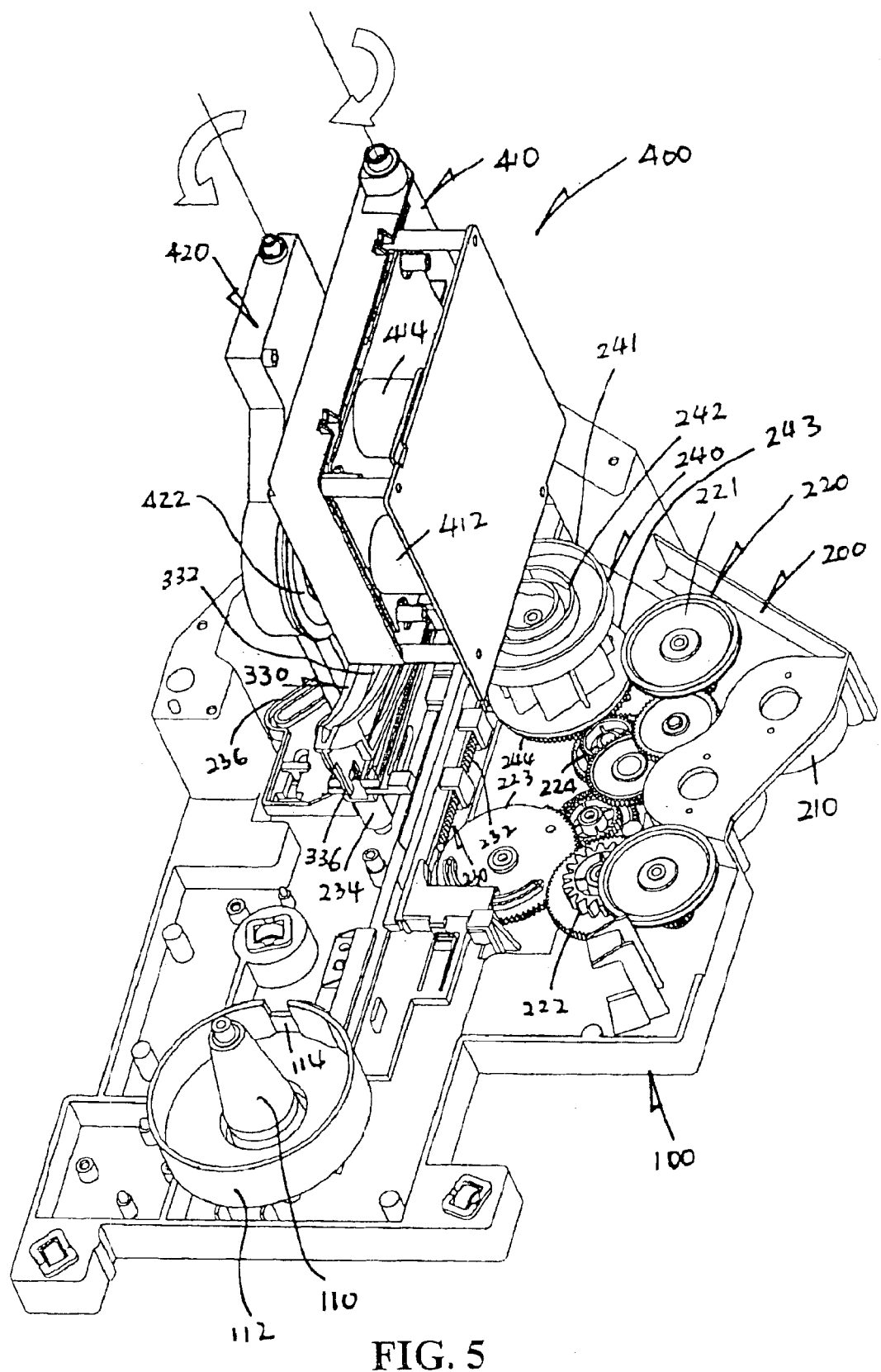
FIG. 5 is a top perspective view of the disc changer of FIG. 4, showing subsequent closing of the playing mechanism by the drive mechanism.
Figure 6:
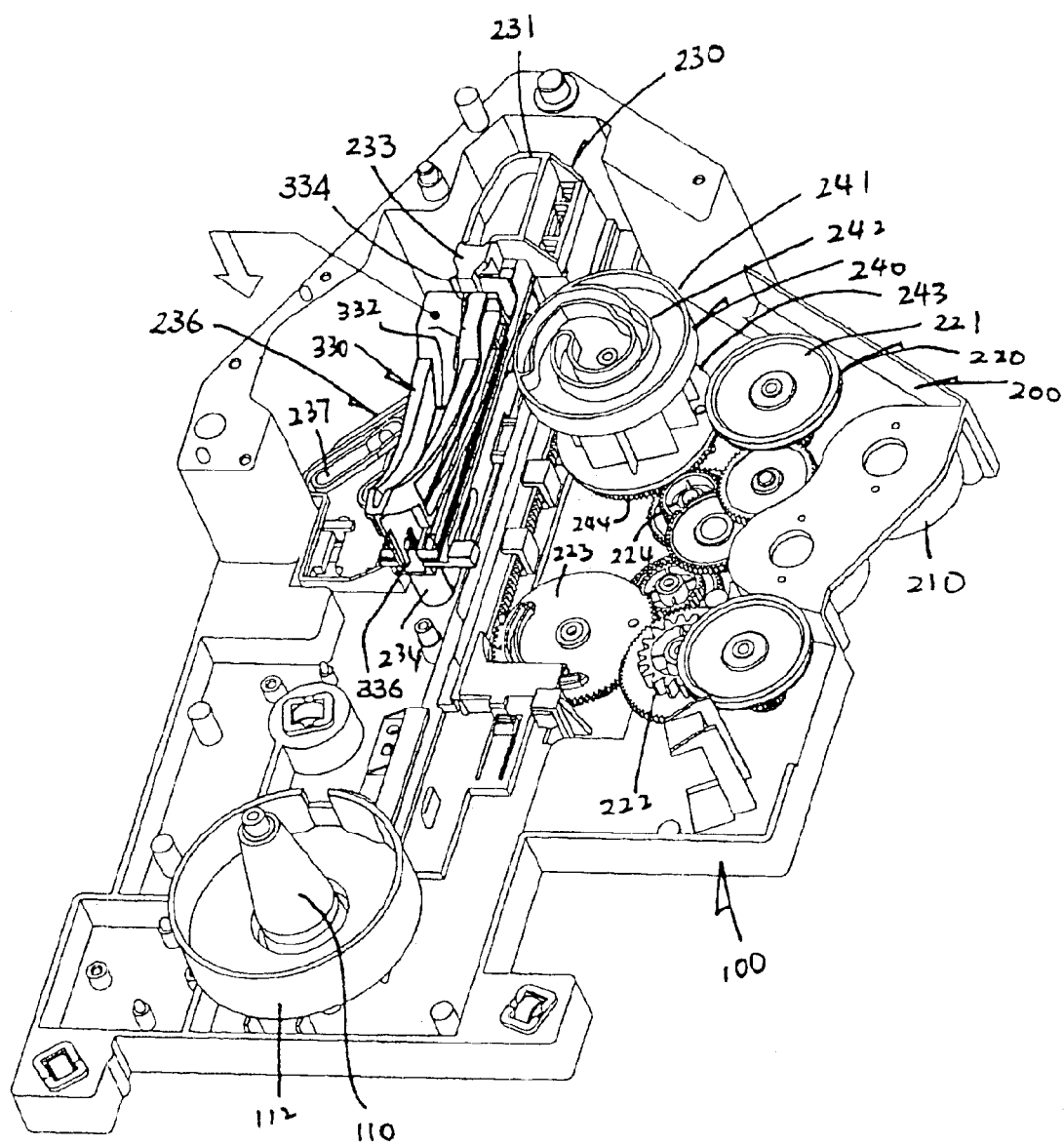
FIG. 6 is a top perspective view of the disc changer of FIG. 5, showing subsequent lowering of the bracket by the drive mechanism.

Upon stopping of the slider 230, the top cam track 242 comes into action and pivots the playing and clamping units 410 and 420 close (FIG. 5) to thereby hold the aligned disc D for subsequent playing. At this moment, the disc D remains in the recess 332 of the bracket 330 previously transporting it. To completely free the disc D for spinning, the bracket 330 should preferably be lowered, and this is achieved by slightly sinking the platform 234 (FIGS. 6 and 7).

The mount 236 is supported on the base 100 for sliding back-to-front, whilst the platform 234 is suspended alongside the mount 236 by two horizontal pins (not shown) of the latter passing through associated inclined slots 235 of the former. Upon closing of the playing mechanism 400, the bottom cam track 245 comes into action and pulls the sliding bar 246 to slide the mount 236 forwards through another cam action between the bar end 248 and the slanted slot 237. This results in a yet further cam action between the aforesaid mount pins and the support slots 235, whereby the platform 234 sinks to lower the bracket 330 slightly away from the disc D now held by the playing mechanism 400 so that the disc D can spin without obstruction.

Figure 3:
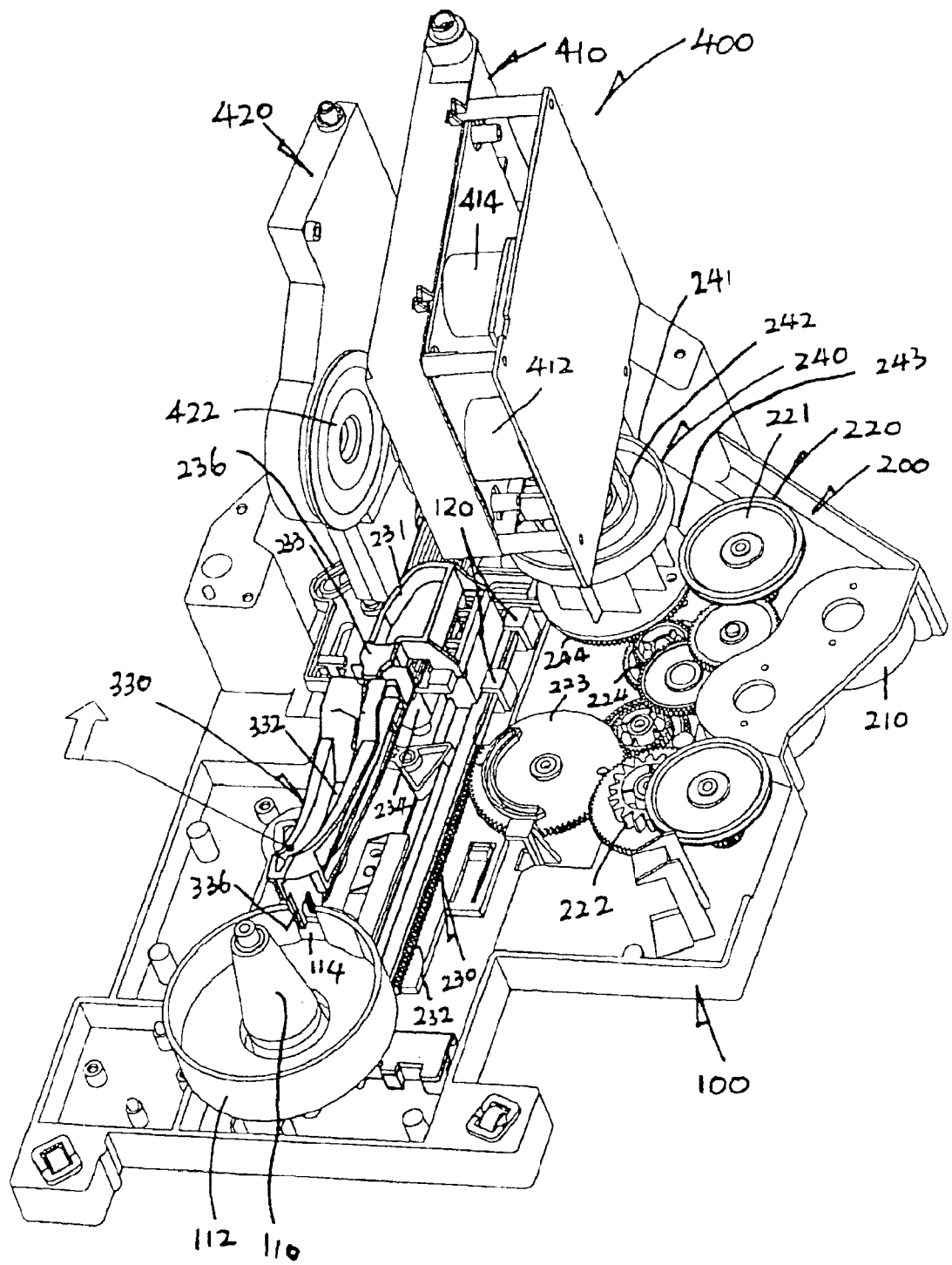
FIG. 3 is a top perspective view of the disc changer of FIG. 2, with a turntable except one of its disc support brackets removed and a top plate also removed, showing a drive mechanism for the bracket and the playing mechanism.
Figure 4:
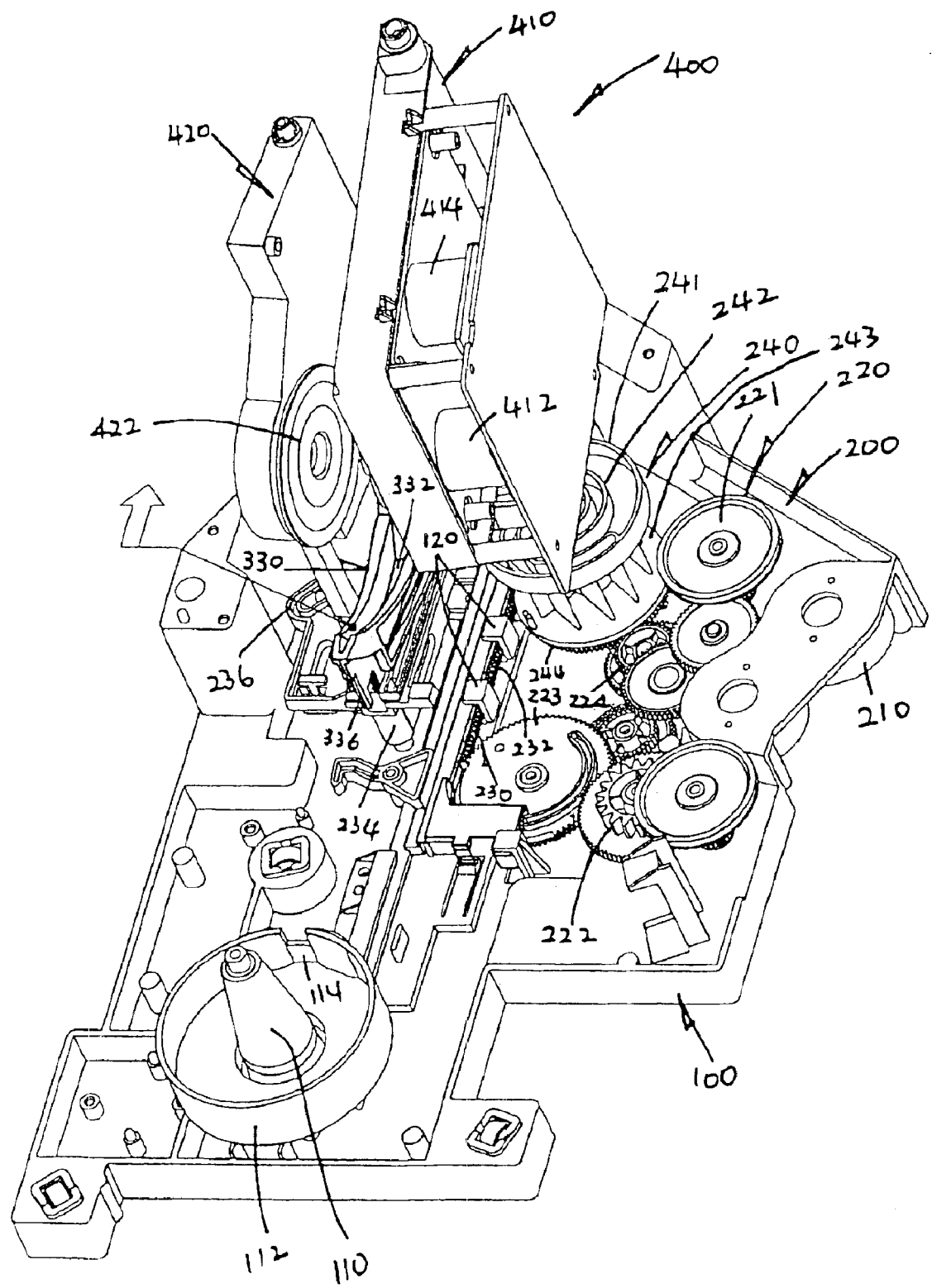
FIG. 4 is a top perspective view of the disc changer of FIG. 3, showing pulling back of the bracket by the drive mechanism.
Figure 7:
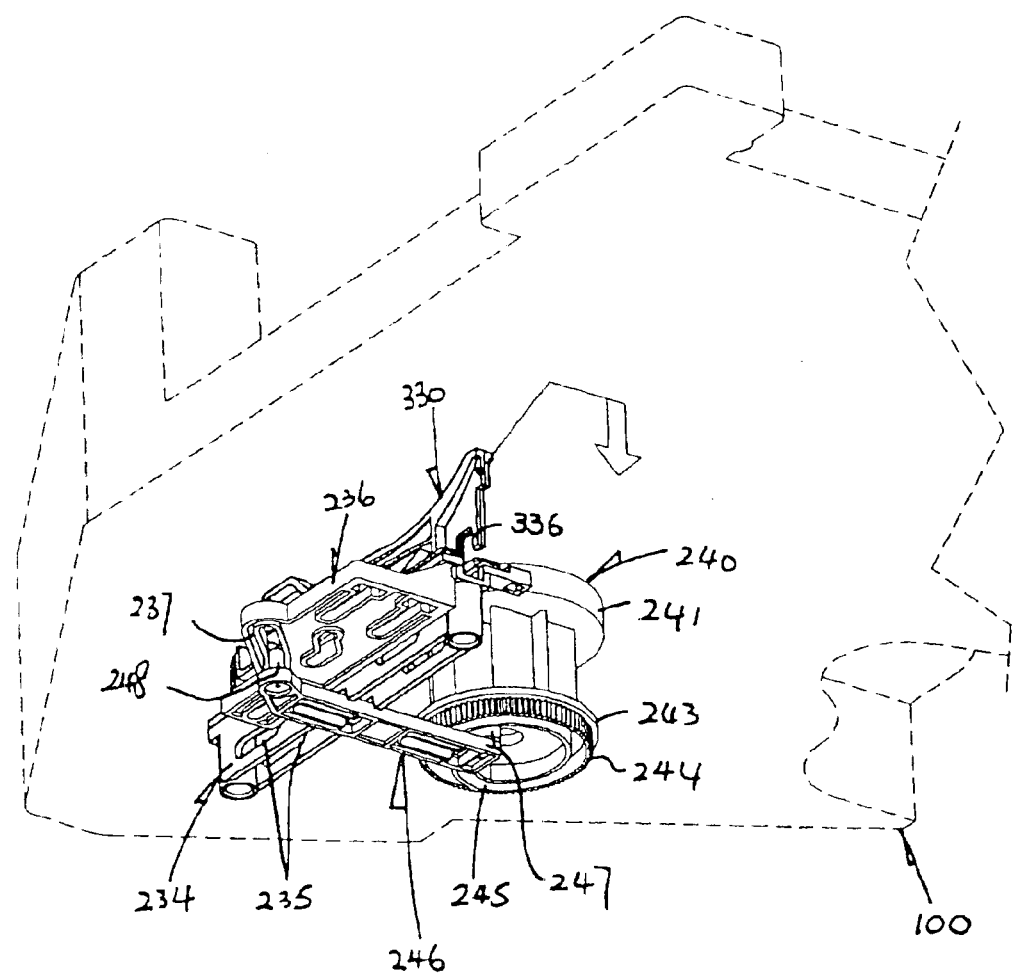
FIG. 7 is a bottom perspective view of the disc changer of FIG. 6, showing the bracket and associated parts of the drive mechanism.

The sequence of operations is reversed to unload the disc D from the playing mechanism 400 and then return it to the turntable 300, as illustrated from FIG. 7 back to FIG. 3. In particular, the motor 210 is reversed to operate the drive mechanism 200 in the opposite direction, such that all the steps described above will take place in the reversed order with the associated actions performed in the opposite direction.

That is to say, sliding back the mount 236 to raise the platform 234 and in turn the bracket 330 for re-supporting the disc D, opening the playing mechanism 400 to release the disc D, and sliding the slider 230 forwards to return the bracket 330 and hence the disc D back to the turntable 300.

The gearwheel 223 will disengage from the toothed rack 232 (not shown) as soon as the disc D is returned, whereupon only the turntable 300 alone is operable by the drive mechanism 200 by invoking the gearwheel 222. Upon turning of the turntable 300, the outer hooks 334 of the brackets 330 are freely rotatable relative to the hook 233 of the disc retrieving slider 230, given that they face in opposite upward and downward directions. The turntable 300 may be rotated to turn another selected disc D to the rearmost position for retrieval and subsequent playing, and the operation as described above will repeat.

Given that the discs D are supported to rest on the corresponding brackets 330, they are subject to minimum damages through handling. The linear transportation of the discs D between the turntable 300 and the playing mechanism 400 minimises the vertical dimension of the overall disc changer 10.

The invention has been given by way of example only, and various modifications of and/or alterations to the described embodiment may be made by persons skilled in the art without departing from the scope of the invention as specified in the appended claims.

What is claimed is:

1. A multiple disc player comprising:
   a turntable for holding a plurality of discs generally upright in an annular arrangement;
   a playing mechanism provided adjacent the turntable for playing a selected one of the discs retrieved from the turntable;
   a disc mover for moving said selected disc from the turntable to the playing mechanism and later back to the turntable; and
   a motor-driven drive mechanism for operating the turntable, the playing mechanism and the disc mover;
   wherein the turntable includes a plurality of disc supports for supporting the discs thereon respectively, each support being slidable substantially radially from and to the turntable; and
   the disc mover is releasably engageable with a disc support supporting said selected disc for moving the disc by the support.

2. The multiple disc player as claimed in claim 1, wherein each disc support is elongate and extends radially on the turntable.

3. The multiple disc player as claimed in claim 2, wherein each disc support includes a co-extending central recess for locating a corresponding disc by its lower rim.

4. The multiple disc player as claimed in claim 2, wherein the turntable includes a circular base having an upper side that has an annular arrangement of radially-extending channels slidably locating the disc supports respectively.

5. The multiple disc player as claimed in claim 1, wherein the turntable is rotatable about an annular retainer that retains the disc supports to the turntable by their inner ends, the retainer including a break for releasing one of the supports that supports said selected disc.

6. The multiple disc player as claimed in claim 5, wherein the turntable includes a circular base locating the disc supports, the base having an opening or openings adjacent the retainer that expose the inner ends of the disc supports for retaining by the retainer.

7. The multiple disc player as claimed in claim 1, wherein the disc supports have outer ends including respective hooks facing in one direction for engagement by a co-operating hook of the disc mover facing in the opposite direction, such that the support hooks are rotatable relative to the mover hook.

8. The multiple disc player as claimed in claim 1, wherein the disc mover is supported for substantially linear movement by the drive mechanism to move a disc support between the turntable and the playing mechanism, thereby transporting said selected disc on the disc support between the turntable and the playing mechanism.

9. The multiple disc player as claimed in claim 1, wherein the disc mover includes a platform for supporting the disc support upon reaching the playing mechanism at a predetermined position, such that said selected disc is centrally in substantially alignment with a rotary disc support and clamp of the playing mechanism.

10. The multiple disc player as claimed in claim 9, wherein the platform is supported for upward and downward movement such that it is sinkable to free said selected disc for spinning by the playing mechanism.

11. The multiple disc player as claimed in claim 1, wherein the playing mechanism comprises a playing unit having a rotary disc support and clamp and a laser head and includes a clamping unit, the two units being mounted for pivotal movement above respective axes substantially perpendicular to the turntable.

* * * * *